W. F. WYMAN.
PACKING AND UPHOLSTERY MATERIAL.
APPLICATION FILED DEC. 31, 1908.
934,782. Patented Sept. 21, 1909
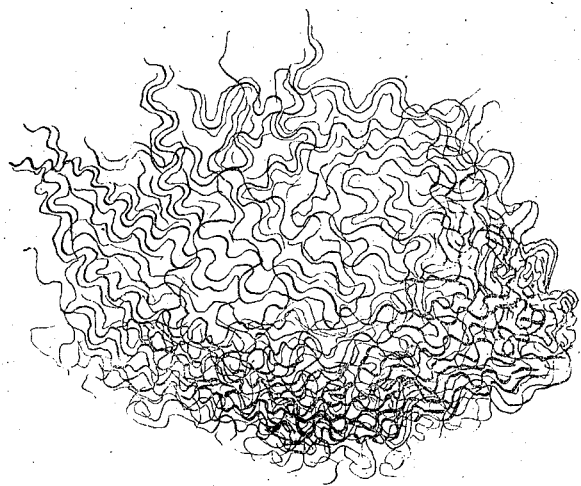

UNITED STATES PATENT OFFICE.

WILLIAM F. WYMAN, OF OSHKOSH, WISCONSIN, ASSIGNOR OF ONE-HALF TO JOSEPH A. CRUM, OF OSHKOSH, WISCONSIN.

PACKING AND UPHOLSTERY MATERIAL.

934,782.

Specification of Letters Patent.  Patented Sept. 21, 1909.

Application filed December 31, 1908.  Serial No. 470,228.

*To all whom it may concern:*

Be it known that I, WILLIAM F. WYMAN, a citizen of the United States, and resident of Oshkosh, in the county of Winnebago and State of Wisconsin, have invented certain new and useful Improvements in Packing and Upholstering Material; and I do hereby declare that the following is a full, clear, and exact description thereof.

My invention consists in a product manufactured from grasses particularly coarse, tough marsh grass such as herbivorous animals refuse to eat; said product constituting a cheap, elastic non-resinous and preferably deodorized and sterilized packing and upholstery material designed as an economical substitute for the now expensive excelsior to which it is preferable because of its being non-inflammable under ordinary conditions, or slow burning if ignited, and which is not susceptible to changes of atmospheric conditions nor liable to leave its imprint on varnished goods packed therewith; said product being hereinafter more particularly set forth with reference to the accompanying drawing and pointed out in claims of this specification.

The drawing represents a mass of my product, that results from a crimping and drying of grass preferably coarse, tough marsh grass, primarily treated to a coating of salt or other suitable non-inflammable material with which coloring matter is sometimes incorporated, and in some instances the grass is deodorized and sterilized by subjecting the same to fumes of sulfur and formaldehyde, the product being a non-resinous, elastic packing and upholstery material having a dry glutinous fire-resisting glaze whether colored or not according to the demands of the trade. The glaze also insures retention of the crimps in the aforesaid material.

I claim:

1. A packing and upholstery material consisting of crimped and dried grass having a fire-resisting glaze.

2. A packing and upholstery material consisting of deodorized and sterilized, crimped and dried grass having a fire-resisting glaze.

3. A packing and upholstery material consisting of colored, crimped and dried grass having a fire-resisting glaze.

4. A packing and upholstery material consisting of deodorized, colored and crimped grass having a fire-resisting glaze.

In testimony that I claim the foregoing I have hereunto set my hand at Oshkosh in the county of Winnebago and State of Wisconsin in the presence of two witnesses.

WILLIAM F. WYMAN.

Witnesses:
 CHAS. OELLERICH,
 OLIVE E. ARNOLD.